United States Patent
Li et al.

(10) Patent No.: US 10,051,536 B2
(45) Date of Patent: Aug. 14, 2018

(54) NETWORK OFFLOADING

(71) Applicant: Telefonaktiebolaget L M Ericsson (publ), Stockholm (SE)

(72) Inventors: Lei Li, Beijing (CN); Yi Wu, Beijing (CN); Meng Zhang, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 141 days.

(21) Appl. No.: 14/647,020

(22) PCT Filed: Nov. 23, 2012

(86) PCT No.: PCT/CN2012/085153
§ 371 (c)(1),
(2) Date: May 22, 2015

(87) PCT Pub. No.: WO2014/079039
PCT Pub. Date: May 30, 2014

(65) Prior Publication Data
US 2015/0312823 A1   Oct. 29, 2015

(51) Int. Cl.
*H04W 36/14* (2009.01)
*H04W 36/22* (2009.01)
*H04W 28/08* (2009.01)

(52) U.S. Cl.
CPC ......... *H04W 36/14* (2013.01); *H04W 28/08* (2013.01); *H04W 36/22* (2013.01)

(58) Field of Classification Search
CPC ..... H04W 36/14; H04W 28/08; H04W 36/22; H04L 12/28; H04L 67/10
See application file for complete search history.

(56) References Cited

U.S. PATENT DOCUMENTS

| | | | |
|---|---|---|---|
| 6,594,486 B1 * | 7/2003 | Rasanen | H04W 36/14 370/467 |
| 2004/0219918 A1 * | 11/2004 | Kakishima | H04W 36/30 455/436 |

(Continued)

FOREIGN PATENT DOCUMENTS

| | | |
|---|---|---|
| CN | 101835201 A | 9/2010 |
| CN | 101945458 A | 1/2011 |

(Continued)

OTHER PUBLICATIONS

3GPP TS 33.402 V11.4.0 (Jun. 2012), titled 3rd Generation Partnership Project; Technical Specification Group Services and System Aspects; 3GPP System Architecture Evolution (SAE); Security aspects of non-3GPP accesses (Release 11) was published Jun. 2012.*

(Continued)

*Primary Examiner* — Raj Jain
*Assistant Examiner* — Hoyet H Andrews
(74) *Attorney, Agent, or Firm* — Sage Patent Group

(57) ABSTRACT

Network connection is provided by a method is performed in a control node. An indication pertaining to at least partly transfer a data transmission service of a wireless device from using a first network access method to using a second network access method associated with a network node is received. The network node is associated with a compatibility version. The indication comprises a compatibility version of the wireless device for the second network access method. The compatibility version of the wireless device is compared to the compatibility version of the network node. It is determined if there is a version mismatch between the compatibility version of the wireless device and the compatibility version of the network node. If so, an expected performance impact of the wireless device using the second network access method is determined. Based on the deter- (Continued)

mined performance impact, it is indicated whether or not the wireless device is allowed to establish a connection to the network node.

33 Claims, 4 Drawing Sheets

(56) References Cited

U.S. PATENT DOCUMENTS

| | | | | |
|---|---|---|---|---|
| 2005/0148321 | A1* | 7/2005 | Igarashi | H04L 63/08 455/411 |
| 2006/0068789 | A1* | 3/2006 | Vannithamby | H04W 36/0055 455/436 |
| 2007/0053362 | A1* | 3/2007 | Garg | H04L 41/00 370/395.1 |
| 2007/0070935 | A1* | 3/2007 | Prakash | H04L 63/102 370/328 |
| 2007/0224994 | A1* | 9/2007 | Kakishima | H04W 36/30 455/436 |
| 2008/0096608 | A1* | 4/2008 | Wendling | G06F 8/61 455/558 |
| 2008/0240037 | A1* | 10/2008 | Bedekar | H04W 92/02 370/331 |
| 2008/0298275 | A1* | 12/2008 | De Sousa | H04W 16/18 370/255 |
| 2008/0307487 | A1* | 12/2008 | Choyi | H04L 63/20 726/1 |
| 2009/0023454 | A1* | 1/2009 | MacInnis | H04L 47/805 455/452.2 |
| 2009/0055899 | A1* | 2/2009 | Deshpande | H04L 65/1069 726/4 |
| 2009/0207817 | A1* | 8/2009 | Montemurro | G06F 9/5011 370/338 |
| 2010/0085950 | A1 | 4/2010 | Sekiya et al. | |
| 2010/0195632 | A1* | 8/2010 | Prabhu | H04W 36/32 370/338 |
| 2010/0197281 | A1* | 8/2010 | Bennett | H04L 12/14 455/414.1 |
| 2010/0220665 | A1* | 9/2010 | Govindan | H04L 47/10 370/329 |
| 2010/0226339 | A1* | 9/2010 | Stephenson | H04W 24/08 370/332 |
| 2010/0273504 | A1* | 10/2010 | Bull | G01S 5/02 455/456.1 |
| 2010/0329209 | A1* | 12/2010 | Akselsen | H04W 36/14 370/331 |
| 2011/0119765 | A1* | 5/2011 | Hering | G06F 21/577 726/25 |
| 2011/0222523 | A1 | 9/2011 | Fu et al. | |
| 2011/0252123 | A1 | 10/2011 | Sridhar et al. | |
| 2011/0286437 | A1 | 11/2011 | Austin et al. | |
| 2011/0310867 | A1* | 12/2011 | Kennedy | G01C 21/3461 370/338 |
| 2011/0319073 | A1* | 12/2011 | Ekici | H04W 48/18 455/426.1 |
| 2012/0020204 | A1* | 1/2012 | Morera | H04W 48/18 370/217 |
| 2012/0113965 | A1 | 5/2012 | Puthenpura et al. | |
| 2012/0263084 | A1 | 10/2012 | Liu et al. | |
| 2014/0064158 | A1* | 3/2014 | Timus | H04W 36/30 370/279 |

FOREIGN PATENT DOCUMENTS

| | | | | |
|---|---|---|---|---|
| EP | | 1564936 A2 | 8/2005 | |
| EP | | 2461631 A2 | 6/2012 | |
| WO | WO 2006031671 A2 * | 3/2006 | | H04W 36/0066 |
| WO | | 2008133335 A1 | 11/2008 | |
| WO | | 2010108144 A1 | 9/2010 | |
| WO | | 2010137942 A1 | 12/2010 | |
| WO | WO 2011019976 A1 * | 2/2011 | | |
| WO | | 2011149533 A1 | 12/2011 | |
| WO | | 2012148482 A1 | 11/2012 | |

OTHER PUBLICATIONS

3GPP TS 33.234 V10.2.0 (Mar. 2012), titled, 3rd Generation Partnership Project; Technical Specification Group Services and System Aspects; 3G Security; Wireless Local Area Network (WLAN) interworking security (Release 10) was published Mar. 2012.*
3GPP TS 24.234 V11.3.0 (Jun. 2012), titled 3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 11).*
3GPP TS 24.302 V11.4.0 (Sep. 2012), titled 3rd Generation Partnership Project; Technical Specification Group Core Network and Terminals; Access to the 3GPP Evolved Packet Core (EPC) via non-3GPP access networks; Stage 3 (Release 11).*
3GPP TS 23.402 V10.8.0 (Sep. 2012), titled "Technical Specification Group Services and System Aspects; Architecture enhancements for non-3GPP accesses, (Release 10)" (TS 23-402 hereinafter) was published as Sep. 2012, pp. 01-232.*
Liang Hu et al, How much can Wi-Fi offload? A Large-scale Dense-urban Indoor Deployment Study, IEEE VTC spring 2012, May 2012, 6 pages.
Qualcomm, "A Comparison of LTE Advanced HetNets and Wi-Fi," Oct. 2011, 16 pages.
Supplementary European Search Report, dated Aug. 4, 2016, in connection with European Application No. 12888753, all pages.
European Search Opinion, dated Aug. 4, 2016, in connection with European Application No. 12888753, all pages.
PCT International Search Report, dated Aug. 29, 2013, in connection with International Application PCT/CN2012/085153, all pages.
PCT Written Opinion, dated Aug. 29, 2013, in connection with International Application PCT/CN2012/085153, all pages.

* cited by examiner

NETWORK OFFLOADING

TECHNICAL FIELD

Embodiments presented herein relate to offloading in a communication network, and particularly to offloading between different network access methods in a communication network.

BACKGROUND

In communication networks, there is always a challenge to obtain good performance and capacity for a given communications protocol, its parameters and the physical environment in which the communication network is deployed.

Data increase in communication networks implies that the traffic load in cellular networks such as the 3rd Generation Partnership Project (3GPP) telecommunications standard and the Long Term Evolution (LTE) telecommunications standard will grow. Considering the fact that most of the data traffic occur in hot spots and buildings, the idea of using carrier grade Wi-Fi network to offload the data traffic from cellular networks has been introduced.

Since most wireless devices (in LTE termed user equipment, such as smart phones, mobile phones, tablet computers, and other handset equipment) comprise an embedded Wi-Fi module, offloading may be realized by in the wireless device setting a higher priority to Wi-Fi access. Call admission control or radio resource management methods may be used for offloading purposes. In general terms, offloading is to be interpreted as at least partly moving communications resources of a wireless device from a first network to a second network, thereby offloading the first network. These methods consider mainly radio signal strength detection/comparison and load balance when determining whether or not offloading should occur.

Wi-Fi technology has experienced a considerable evolution in the past decade: from the standards IEEE 802.11b and IEEE 802.11a to the standards IEEE 802.11g and IEEE 802.11n and recently the standard IEEE 802.11ac. Each revised version corresponds to a particular Wi-Fi physical layer (PHY) specification, i.e., to a particular hardware implementation. Even after more than 5 years of the standardization of IEEE 802.11g, many wireless devices in use only support IEEE 802.11b. Hence it is expected that there simultaneously will be wireless devices supporting communications in the 2.4 GHz frequency band (as in IEEE 802.11n, IEEE 802.11g, and IEEE 802.11b) and communications in the 5 GHz frequency band (as in IEEE 802.11n, IEEE 802.11a, and IEEE 802.11ac). Backward compatibility was therefore included from IEEE 802.11g and beyond. However, introducing a wireless device supporting a lower PHY version into a Wi-Fi network providing a higher PHY version will trigger a mixed-mode operation and lead to a performance drop of the whole Wi-Fi network.

Hence, there is still a need for an improved offloading between different types of communications networks.

SUMMARY

An object of embodiments herein is to provide improved offloading between different types of communications networks.

The inventors of the enclosed embodiments have through a combination of practical experimentation and theoretical derivation realized that none of the existing algorithm has considered the legacy client mixing issue caused by different Wi-Fi modules. For example, assume an IEEE 802.11n compliant Wi-Fi network to which several wireless devices supporting IEEE 802.11n have been offloaded from another network. Assume further that a further wireless device with a Wi-Fi module supporting only IEEE 802.11b or below is also offloaded to the IEEE 802.11n compliant Wi-Fi network. The new joining IEEE 802.11b compliant wireless device will trigger a transfer from so-called Greenfield mode to a mixed mode (i.e. from 5 GHz to 2.4 GHz) of the current IEEE 802.11n network and as a result, all existing IEEE 802.11n compliant wireless devices will experience a "slow down" problem.

A particular object is therefore to provide improved offloading between different types of communications networks based on a supported network version of the wireless device.

The inventors of the enclosed embodiments have realized that a method for controlling Wi-Fi offloading from a cellular network should be based on the knowledge of match or mismatch between the Wi-Fi version of the wireless device to be offloaded and the Wi-Fi version of the associated access point of the Wi-Fi network.

According to a first aspect there is presented a method for indicating network connection. The method is performed in a control node. The method comprises receiving an indication pertaining to at least partly transfer a data transmission service of a wireless device from using a first network access method to using a second network access method associated with a network node. The network node is associated with a compatibility version. The indication comprises a compatibility version of the wireless device for the second network access method. The method comprises comparing the compatibility version of the wireless device to the compatibility version of the network node. The method comprises determining if there is a version mismatch between the compatibility version of the wireless device and the compatibility version of the network node. If so, the method comprises determining an expected performance impact of the wireless device using the second network access method. The method further comprises indicating, based on the determined performance impact, whether or not the wireless device is allowed to establish a connection to the network node.

Advantageously this method in an efficient manner uses the knowledge of compatibility versions of wireless devices into account when determining whether or not the wireless device is allowed to establish a connection to the network node.

Advantageously this enables a version mismatched wireless device to be offloaded only in a case the expected performance impact is within an acceptable range.

For example, in a case the version represents a Wi-Fi standard version, matching between the wireless device and a network node in the form of a WiFi access point may be performed in order to improve the Wi-Fi efficiency during offloading. Since the Wi-Fi technology is still growing, diverse types of Wi-Fi module products with different WiFi compatibility versions will coexist in the market for a long time. This because the Wi-Fi module (and hence the WiFi compatibility version) is implemented in hardware of the WiFi device. Therefore, the disclosed embodiments may enable higher utilization efficiency for Wi-Fi offloading and enhance the whole network capacity.

According to a second aspect there is presented a control node for determining network connection. The control unit comprises a receiver arranged to receive an indication pertaining to at least partly transfer a data transmission service of a wireless device from using a first network access method to using a second network access method associated with a network node. The network node is associated with a compatibility version. The indication comprises a compatibility version of the wireless device for the second network access method. The control unit comprises a processing unit arranged to compare the compatibility version of the wireless device to the compatibility version of the network node. The processing unit is further arranged to determine if there is a version mismatch between the compatibility version of the wireless device and the compatibility version of the network node. If so the processing unit is arranged to determine an expected performance impact of the wireless device using the second network access method. The processing unit is further arranged to indicate, based on the determined performance impact, whether or not the wireless device is allowed to establish a connection to the network node.

According to a third aspect there is presented a computer program for for determining network connection, the computer program comprising computer program code which, when run on a control node, causes the control node to perform a method according to the first aspect.

According to a fourth aspect there is presented a computer program product comprising a computer program according to the third aspect and a computer readable means on which the computer program is stored. According to an embodiment the computer readable means are non-volatile computer readable means.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The inventive concepts will now be described more fully hereinafter with reference to the accompanying drawings, in which certain embodiments of are shown. The inventive concepts may, however, be embodied in many different forms and should not be construed as limited to the embodiments set forth herein; rather, these embodiments are provided by way of example so that this disclosure will be thorough and complete, and will fully convey the scope of the inventive concepts to those skilled in the art. Like numbers refer to like elements throughout the description.

Figure 1:
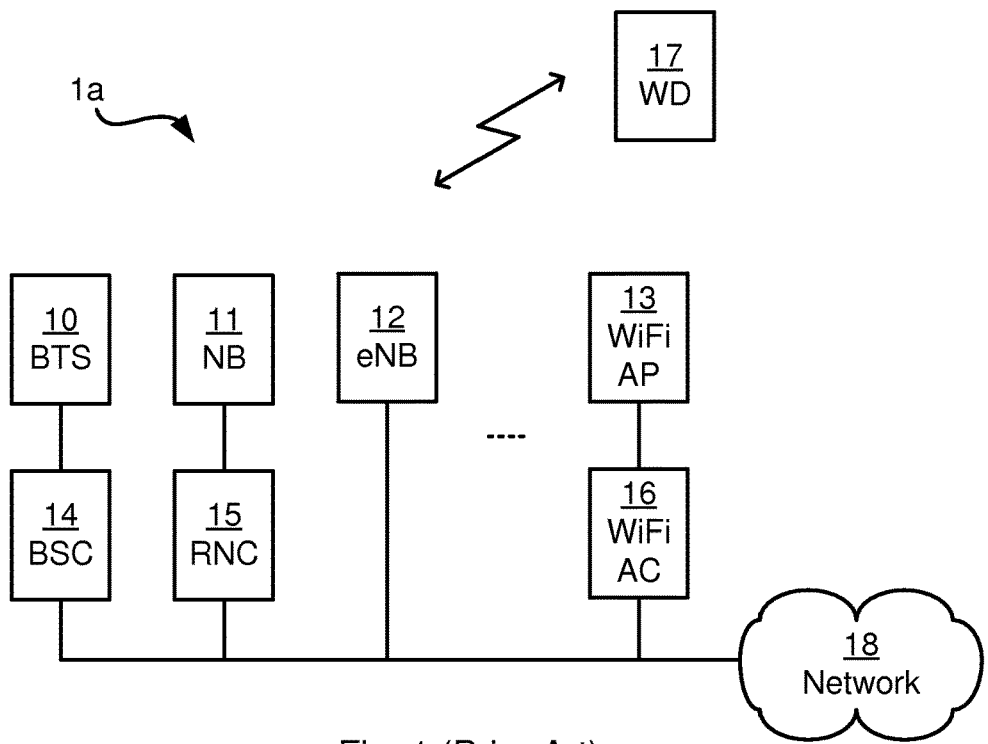
FIG. 1 is a schematic diagram illustrating a communication network according to prior art.

Radio link improvement is approaching the theoretical limit and the spectrum available to operators is often limited and expensive. The next performance and capacity leap may come from a network topology evolution utilizing a plurality of a mix of macro cells and pico or micro cells, and utilizing a plurality of network access methods. Such networks are referred to as heterogeneous networks. FIG. 1 is a schematic diagram illustrating a communication network 1a according to prior art. As schematically illustrated in FIG. 1 a wireless device 17 is enabled to access services provided by the network 18 in a number of different ways. As the skilled person understands the number of such available ways to access the network 18 generally depends on the network topology of the actual network used and the functionality, capability and compatibility of the wireless device (WD) 17. According to the communication network 1a of FIG. 1 the WD 17 is enabled to access the network 18 by one or more of a base transceiver station (BTS) 10, a NodeB (NB) 11, an eNodeB, E-UTRAN NodeB, also known as Evolved NodeB, (eNB) 12 and a WiFi access point (AP) 13. The WD 17 may be one of a user equipment (UE), a mobile terminal, a user terminal, a user agent, a mobile phone, etc. As is understood, the mobile communication system 1a may generally comprise a plurality of network nodes 10, 11, 12, 13 and a plurality of WDs 17.

The communication network 1a may thus generally comply with any one or a combination of W-CDMA (Wideband Code Division Multiple Access), LTE (Long Term Evolution), EDGE (Enhanced Data Rates for GSM Evolution, GPRS (General Packet Radio Service)), CDMA2000 (Code Division Multiple Access 2000), etc., as long as the principles described hereinafter are applicable.

The communication network 1a is compliant with the Evolved Universal Terrestrial Radio Access Network (E-UTRAN) by means of the eNB 12; typically the E-UTRAN consists only of network nodes in the form of eNBs 12 on the network side.

NodeB (NB) is a term used in UMTS (Universal Mobile Telecommunications System) equivalent to the BTS 10 description used in the Global System for Mobile Communications (GSM). For the NB 11 a radio network controller (RNC) 15 is located between the NB 11 and the network 18. The traditional NodeB typically has minimum functionality, and is controlled by the RNC 15. The communication network 1a is thus compliant with the UMTS standard by means of the NB 11 and the RNC 15.

The BTS 10 is connected to the network 18 via a base station controller (BSC) 14 which offers functionality according to the GSM standard. The communication network 1a is thus compliant with the GSM standard by means of the BTS 10 and the BSC 14.

The WiFi AP 13 is connected to the network 18 via a WiFi access controller (AC) 16 which offers functionality according to one or more WiFi standards. Properties of different WiFi standards are provided below. The communication network 1a is thus compliant with one or more WiFi standard by means of the WiFi AP 13 and the WiFi AC 16. There have been several physical layer (PHY) upgrades for the Wi-Fi standard i.e. 802.11b, 802.11a, 802.11g and 802.11in. The corresponding parameters are listed in Table 1.

TABLE 1

802.11a/b/g/n Parameters

| Protocol | Release Date | Op. Frequency | Throughput (Typical) | Data Rate (Max) | Modulation Technique |
|---|---|---|---|---|---|
| 802.11a | 1999 | 5 GHz | 20-25 Mbps | 54 Mbps | OFDM |
| 802.11b | 1999 | 2.4 GHz | 5 Mbps | 11 Mbps | DSSS - CCK |
| 802.11g | 2003 | 2.4 GHz | 23 Mbps | 54 Mbps | OFDM & DSSS |
| 802.11n | 2009 | 2.4G/5G Hz | 50-144 Mbps | 600 Mbps | OFDM MIMO |

Since the PHY upgrades are based on actual device hardware there may be a mix of WDs 17 compliant with different operational frequencies, i.e. both 2.4 GHz (802.11n, 802.11g, 802.11b) and 5 GHz (802.11n, 802.11a, 802.11ac) in the same communication network. It is well known that for a Wi-Fi AP 13 with the latest PHY version, such as 802.11n, a "pure" network with all the connected WDs 17 being 802.11n compliant would thus be in the so-called Greenfield mode and hence approach the best obtainable performance for the WiFi part of the communications network 1a. The presence of a WD 17 compliant only with a legacy version, such as the 802.11b version, in an 802.11g or 802.11n compliant communication network causes the WDs 17 which are compliant with the 802.11g or 802.11n versions to resort to inefficient behaviour since the WiFi AP 13 and/or WiFi AC 16 has to make sure that the 802.11b compliant WDs 17 do not transmit when the 802.11g/802.11n compliant WDs 17 are using the airwaves, and to make sure that both the 802.11b and 802.11g/802.11n compliant WDs 17 are able to receive and detect beacons, preambles, and the like. This principle is called backward compatible protection for legacy clients.

There may be an impact of the mixing of different types of Wi-Fi WDs 17 (i.e. WDs 17 being compatible with different versions of the WiFi standard) on the WiFi part of the communications network 1a even if legacy WDs 17 are not active (but still present). This is because that when the WiFi AP 13 detects the existence of a legacy WD 17, the WiFi AP 13 would have to switch from the Greenfield mode to the mixed mode. For example, the slot time may have to be enlarged (from 9 µs to 20 µs), the packet header may have to be modulated with an inefficient way, the request to send/clear to send (RTS/CTS) or CTS to self overhead may have to be introduced, etc. This has been verified in practical trials. For example, the throughput of 802.11g compliant WDs 17 in a WiFi network were dropped by 30-50% when a legacy 802.11b compliant WD 17 was operatively coupled to the WiFi network.

The disclosed embodiments concern offloading in a communications network. The offloading involves a process where data transmission is moved from using a first network access method to using a second network access method. The disclosed embodiments are particularly applicable to a Wi-Fi offloading method where a wireless device in a cellular communications network is offloaded to a WiFi communications network. However, the disclosed embodiments are likewise applicable to other offloading methods wherein the participating network nodes and wireless devices are associated with different versions.

According to the state of the art, when a WD 17 is to be offloaded to a WiFi network, the WD 17 is always associated to a detected Wi-Fi AP 13 whenever the received signal strength is higher than a threshold (and assuming, of course, that the WD 17 comprises the necessary communications means for communicating with the WiFi AP 13). There is no consideration of the potential triggering of the Wi-Fi network from operating in the Greenfield mode to the mixed mode due to a new WD 17 being operatively connected to the WiFi AP 13. Hence, there is also no consideration of the resulting potential performance degradation of all the WDs 17 of the Wi-Fi network.

For example, when a legacy 802.11b compliant WD 17 is offloaded to a 802.11n version network (assumed to be operating at 2.4 GHz), all the concurrent 802.11n compliant WDs 17 have to be switched from the Greenfield mode to the mixed mode. The MAC slot time would be changed from a small value (9 µs) to a large value (tops) in order to be compatible with the 802.11b compliant WD 17. Furthermore, more overheads will be introduced which are caused by the HT-mixed format or RTS/CTS and CTS to self. The whole 802.11n Wi-Fi network will be slowed down and all the existing WDs 17 will be impacted.

The disclosed embodiments provides means for indicating network connection and are based on the understanding that information of a compatibility version of the WD 17 could be used during a determination of whether or not the WD 17 is allowed to establish a connection to a network node. For example, according to some embodiments the PHY version of the WDs 17 Wi-Fi module is utilized as a weight factor when making the decision of a Wi-Fi offloading in a current cellular network.

In order to obtain means for indicating network connection there is provided a control node 2, a method performed in the control node 2, a computer program 20 comprising code, for example in the form of a computer program product 19, that when run on the control node 2, causes the control node 2 to perform the method.

Figure 2:
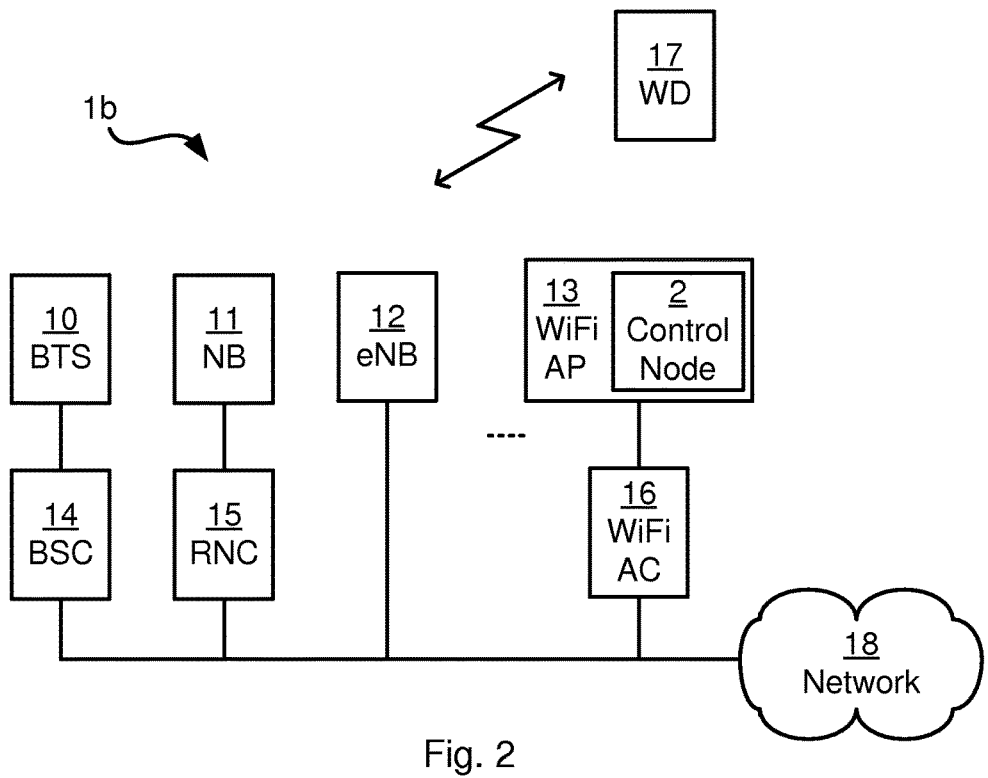
FIGS. 2-4 are schematic diagrams illustrating communication networks where embodiments presented herein may be applied.
Figure 3:
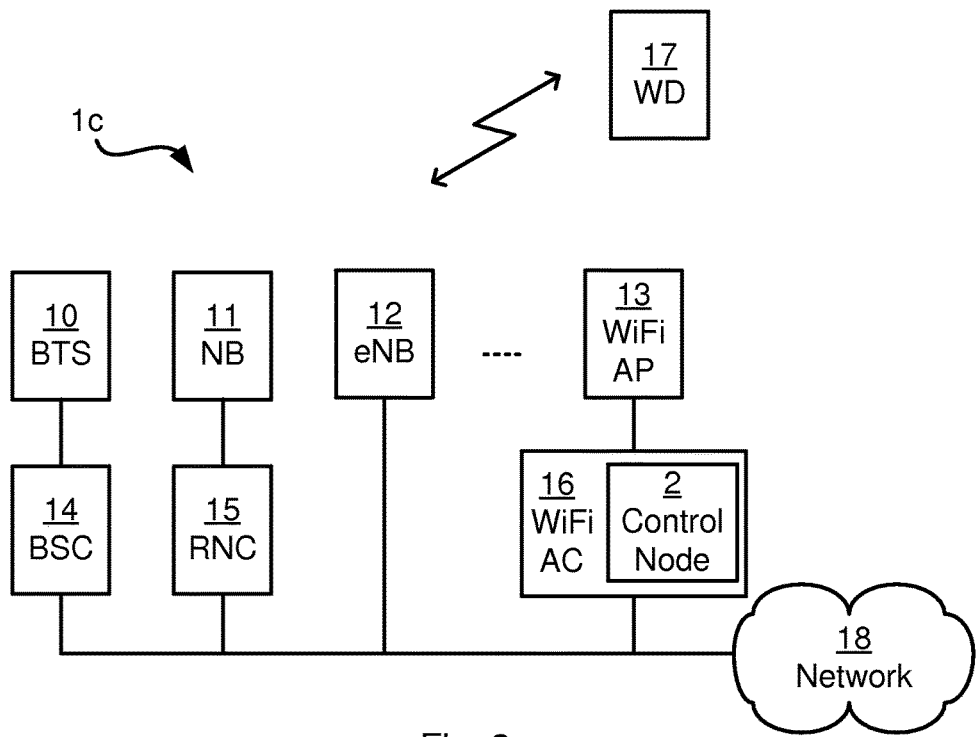
Figure 4:
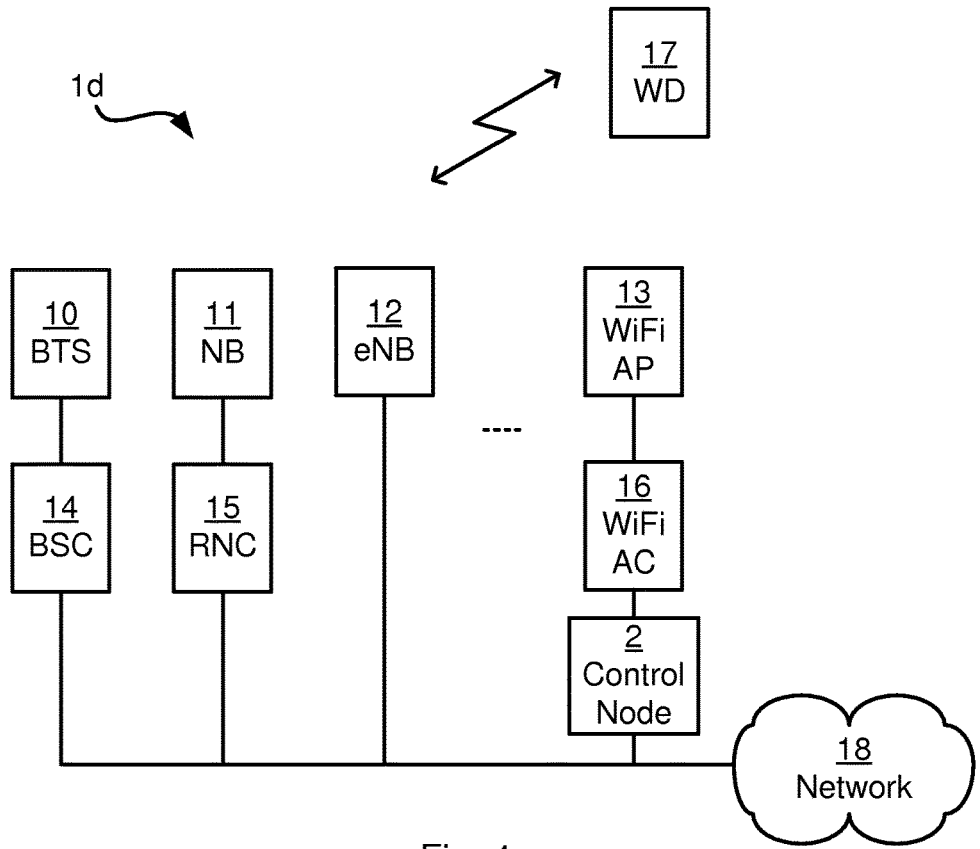

FIGS. 2, 3, and 4 are schematic diagram illustrating communication networks 1b, 1c, 1d where embodiments presented herein can be applied. The communications networks 1b-d comprise a WD 17 arranged to access a service offered by the network 18 by means of being operatively connected to at least one of a BTS 10 (which in turn is connected to the network 18 via a BSC 14), a NB 11 (which in turn is connected to the network 18 via an RNC 15), an eNB 12, or a WiFi AP 13 (which in turn is connected to the network 18 via a WiFi AC 16 as in the communication network ia of FIG. 1. In addition, the communication networks 1b, 1c, 1d further comprise a control node 2 for determining network connection. Properties of the control node 2 will be further disclosed below.

As illustrated by the embodiments of FIGS. 2-4 the control node 2 may be placed at different locations in the communications network 1b-d. According to the embodiment of FIG. 2 the control node 2 is implemented as part of the WiFi AP 13. Hence, according to embodiments the WiFi AP 13 comprises the control node 2. Such an implementation may allow for efficient signalling between the WiFi AP 13 and the control node 2. It may also enable a short signalling path to the WD 17. According to the embodiment of FIG. 3 the control node 2 is implemented as part of the WiFi AC 16. Hence, according to embodiments the WiFi AC 16 comprises the control node 2. Such an implementation may allow for efficient signalling between the WiFi AC 16 and the control node 2. According to the embodiment of FIG. 4 the control node 2 is implemented in an entity located between the WiFi AC 16 and the network 18. Such an implementation may allow for simple integration of the control node 2 in an existing communications network 1*a*. It may also allow for efficient communications between the control node 2 and the network 18. In general terms, the placement of the control node 2 may depend on a number of factors. For example, the control node 2 may be arranged to store all the Wi-Fi APs' 13 capability as well as Wi-Fi standard version. Because of a requirements of traffic load balance and call admission control, the control node 2 may also be arranged to monitor the traffic load status of the APs 13 which can be periodically reported.

Figure 5:
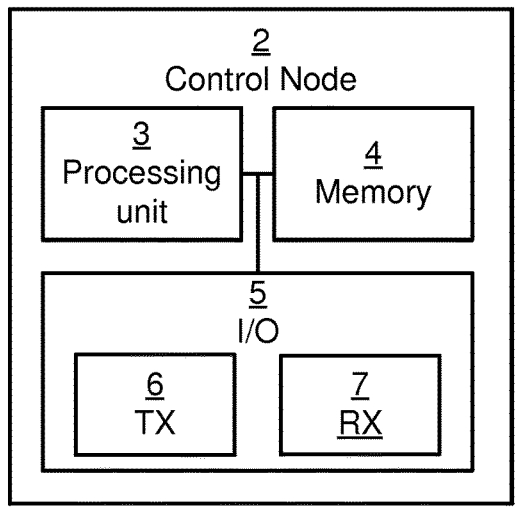
FIG. 5 is a schematic diagram showing functional modules of a control node.

FIG. 5 schematically illustrates, in terms of a number of functional modules, the components of a control node 2. A processing unit 3 is provided using any combination of one or more of a suitable central processing unit (CPU), multi-processor, microcontroller, digital signal processor (DSP), application specific integrated circuit (ASIC), field programmable gate arrays (FPGA) etc., capable of executing software instructions stored in a computer program product 19 (as in FIG. 6), e.g. in the form of a memory 4. Thus the processing unit 3 is thereby arranged to execute methods as herein disclosed. The memory 4 may also comprise persistent storage, which, for example, can be any single one or combination of magnetic memory, optical memory, solid state memory or even remotely mounted memory. The control node 2 may further comprise an input/output (I/O) interface 5 for receiving and providing information to other entities and devices in the communication system 1*b*, 1*c*, 1*d*. The I/O interface 5 therefore comprises one or more transmitters (TX) 6 and receivers (RX) 7. The processing unit 3 controls the general operation of the control node 2, e.g. by sending control signals to the I/O interface 5 and receiving reports and information from the I/O interface 5. Other components, as well as the related functionality, of the control node 2 are omitted in order not to obscure the concepts presented herein.

Figure 6:
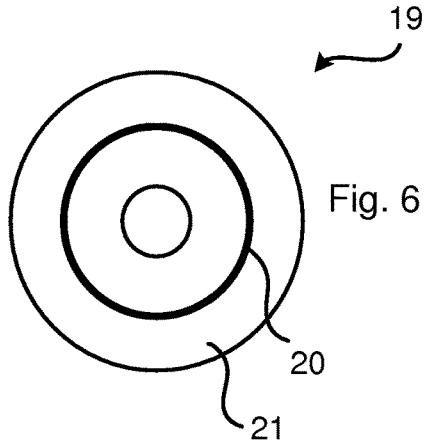
FIG. 6 shows one example of a computer program product comprising computer readable means.
Figure 7:
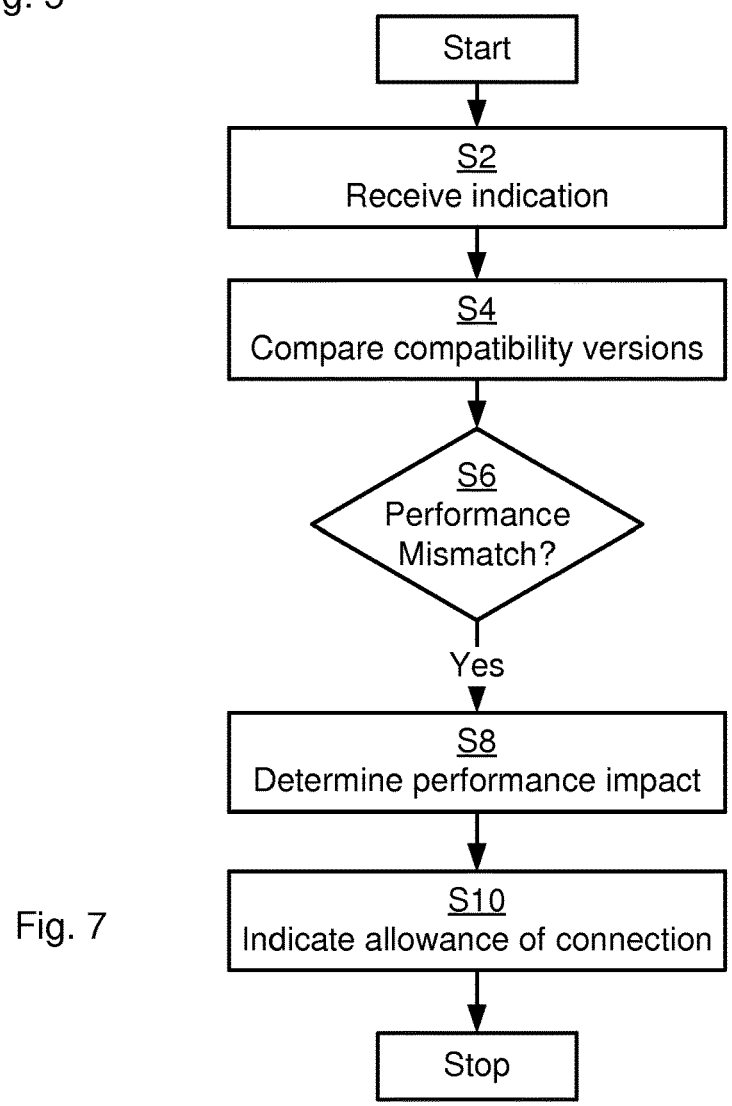
FIGS. 7 and 8 are flowcharts of methods according to embodiments.
Figure 8:
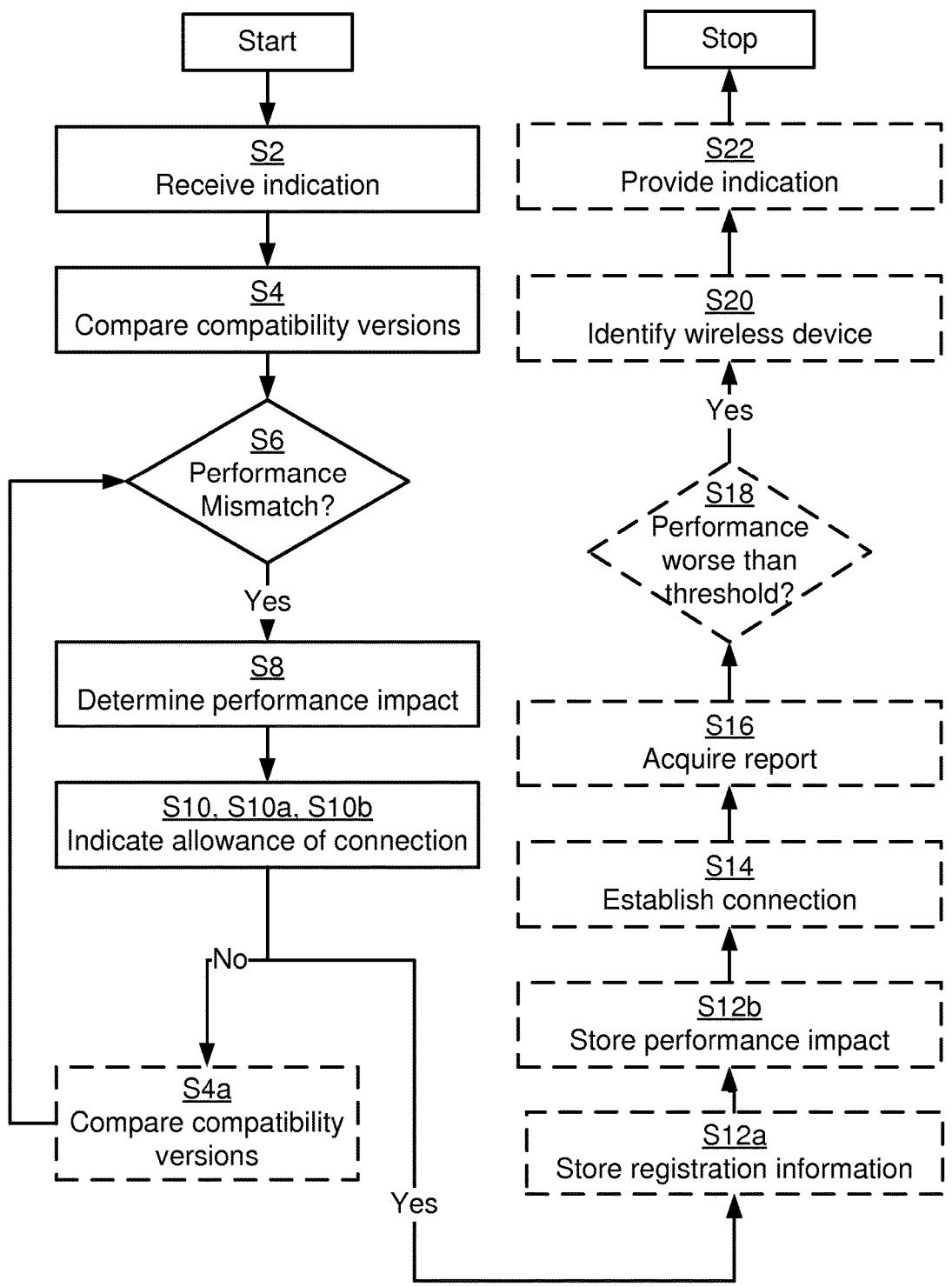

FIGS. 7 and 8 are flow charts illustrating embodiments of methods for indicating network connection. The methods are performed in the control node 2. The methods are advantageously provided as computer programs 20. FIG. 6 shows one example of a computer program product 19 comprising computer readable means 21. On this computer readable means 21, a computer program 20 can be stored, which computer program 20 can cause the processing unit 3 and thereto operatively coupled entities and devices, such as the memory 4, the I/O interface 5, the transmitter 6, and/or the receiver 7 to execute methods according to embodiments described herein. In the example of FIG. 6, the computer program product 19 is illustrated as an optical disc, such as a CD (compact disc) or a DVD (digital versatile disc) or a Blu-Ray disc. The computer program product could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 20 is here schematically shown as a track on the depicted optical disk, the computer program 20 can be stored in any way which is suitable for the computer program product 19.

Returning now to any one of the communication network 1*b*-*d* of FIGS. 1*b*-*d*, when a WD 17 in the communication network 1*b*-*d* satisfies a triggering condition of offloading from using a first network access method to using a second network access method (no matter what kind of the particular trigger rule used), the control node 2 requests a compatibility version of the WD 17 for the second network access method and compares it with the compatibility version of a network node for the second network access method. A method for indicating network connection therefore comprises in a step S2 receiving an indication from a wireless device (WD) 17. The indication is received by the receiver (RX) 7 of the control node 2. The indication pertains to at least partly transfer a data transmission service of the WD 17 from using a first network access method to using a second network access method. According to one embodiment the first network access method utilizes cellular radio communications. According to one embodiment the second network access method utilizes WiFi communications. The second network access method is associated with a network node. The network node is thus compliant with the second access method. In general terms the network node may be a BTS 10, a NB 11, an eNB 12 or a WIFI AP 13. According to one embodiment the network node is a WIFI AP 13. The network node is associated with a compatibility version. The indication comprises a compatibility version of the WD 17 for the second network access method. According to one embodiment the compatibility version is a WiFi version.

The indication may be received from different entities in the communications network 1*b*-*d*. According to a first example, the indication may be received from the network node. Thus, in a case the network node is a WiFi AP 13 the indication may be received from the WiFi AP 13. According to a second example, the indication may be received from a network node of the first network access method. Thus, in a case the first access method is a cellular radio access technology the indication may be received from one of the BTS 10, the NB 11 or the eNB 12. According to a third example the indication is received from the WD 17 itself.

The processing unit 3 of the control node 2 is arranged to, in a step S4, compare the compatibility version of the WD 17 to the compatibility version of the network node of the second network access method. The processing unit 3 of the control node 2 is further arranged to, in a step S6, determine if there is a version mismatch between the compatibility version of the WD 17 and the compatibility version of the network node.

Without losing generality it is for illustrative purposes assumed that the second network access method is WiFi and thus that the compatibility version concerns a WiFi version. If the Wi-Fi module version of the WD 17 is equal or higher than the WiFi version of the associated WiFi AP 13, there is no version mismatch issue. An offload decision may then be made based on other properties than the WiFi version, such as properties relating to the traffic load prediction and evaluation of the added WD 17. Such prediction and evaluation may be performed by the WiFi AP 13, the WiFi AC, 16 or the control node 2, depending on the implementation.

Assume that a current traffic load of the Wi-Fi network at the WiFi AP 13 is δ and that the predicted load of the new WD 17 is Δ. if δ+Δ<limit, where the limit may be the practical saturated load of the Wi-Fi network, then the WD 17 may be permitted to enter the Wi-Fi network by establishing a connection between the WD 17 and the WiFi AP 13. In a real Wi-Fi network, the Wi-Fi traffic load is commonly evaluated by the buffer occupancy of the WiFi AP 13. Otherwise, if the Wi-Fi network at WiFi AP 13 can not admit the new WD 17 due to traffic load, the WiFi AC, 16 or the control node 2 may need to check if there is any other candidate Wi-Fi AP 13 for this WD 17.

In a case there is a version mismatch between the compatibility version of the WD 17 and the compatibility version of the network node, the processing unit 3 of the control node 2 is arranged to, in a step S8, determine an expected performance impact of the WD 17 using the second network access method. According to an embodiment the performance impact relates to a reduction of data transfer rate from the network node in a case the WD 17 is connected to the network node.

The processing unit 3 of the control node 2 is arranged to, in a step S10, indicate, based on the determined performance impact, whether or not the WD 17 is allowed to establish a connection to the network node. The processing unit 3 of the control node 2 may further be arranged to, in a step S10a indicate that the WD 17 is allowed to establish the connection to the network node in a case the data transfer rate is reduced less than a predetermined data transfer rate threshold. For example, if the traffic load of the associated WiFi AP 13 is equal or less than a predefined threshold Φ, the offloading of the particular WD 17 may be allowed. The processing unit 3 of the control node 2 may thus be arranged to, in a step S10b, indicate that the WD 17 is allowed to establish a connection to the network node in a case the current traffic load is lower than a predetermined traffic load threshold. However, the control node 2 may record the version mismatched WD 17 for further balance control. The processing unit 3 of the control node 2 may therefore be arranged to, in a step S12a, store registration information of the WD 17 relating to the compatibility version of the WD 17 for the second network access method in conjunction with indicating that the WD 17 is allowed to establish a connection to the network node. The expected impact of network performance degradation by accepting the new WD 17 may also be recorded. The processing unit 3 of the control node 2 may therefore be arranged to, in a step S12b, store the determined expected performance impact in conjunction with indicating that the WD 17 is allowed to establish a connection to the network node.

In a case the WD 17 is determined not to be allowed to establish the connection to the network node the processing unit 3 of the control node 2 may be arranged to, in a step S4a, compare the compatibility version of the WD 17 to a compatibility version of another network node. The processing unit 3 of the control node 2 may then be arranged to repeat the steps of determining version mismatch, determining expected performance impact and indicating allowance to establish connection for the WD 17 and the another network node. The control node 2 may thereby request the WiFi AC 16 to check if there is any other candidate WI-Fi AP 13 for this WD 17 to be offloaded to.

Once a network node for the second network access method has been found the WD 17 may be operatively connected to the network node. The processing unit 3 of the control node 2 may therefore be arranged to, in a step S14, establish the connection between the WD 17 and the network node. Once the connection between the WD 17 and the network node has been established at least part of the data payload traffic of the data transmission service may be transferred to the connection between the WD 17 and the network node. According to an embodiment at least part of the signalling traffic of the data transmission service keeps using the first network access method. Hence, according to an embodiment only the data payload traffic is offloaded.

The network node may issue reports on the traffic load of the network node. The processing unit 3 of the control node 2 may therefore be arranged to, in a step S16, acquire reports from the network node regarding a current performance using the second network access method. The reports may be stored in a database and/or provided by the network node.

According to an embodiment the report is a data traffic report. The control node 2 may then compare the reports to limits and/or thresholds for offloading. For example, according to an embodiment the processing unit 3 of the control node 2 is arranged to, in a step S18, determine the current performance to be worse than a predetermined performance threshold. The predetermined performance threshold may relate to a current data transmission rate of the network node. The predetermined performance threshold may additionally or alternatively relate to a current traffic load of the network node.

For example, as soon as the control node 2 receives a report from a Wi-Fi AP 13 that the Wi-Fi traffic load has approached a predetermined threshold Ψ, the control node 2 may check if there is any mismatched WD 17 operatively connected to the Wi-Fi network of the Wi-Fi AP 13. The processing unit 3 of the control node 2 may therefore be arranged to, in a step S20, identify at least one WD 17 associated with version mismatch between a compatibility version of the at least one WD 17 and the compatibility version of the network node. The at least one identified WD 17 may further be identified based on its current performance impact in the second network.

The embodiments of the present disclosure could also be readily combined with any load balance scheme. For example, if the load balance scheme monitors the Wi-Fi traffic overloaded and decides to turn some WD 17 back to the cellular access method, the Wi-Fi version mismatched WD 17 may, according to the present disclosure have a higher priority to be turned back to the first access method. The processing unit 3 of the control node 2 may therefore be arranged to, in a step S22, provide an indication that the identified at least one WD 17 is to be disconnected from using the second network access method. The mismatched WDs 17 may thereby be triggered back to the cellular network one by one in an order sorted by the impact of network performance degradation, until the WiFi traffic load turns back to an allowed level.

According to embodiments Ψ>Φ. Thereby the removed WD 17 will not be immediately offloaded to the same Wi-Fi AP 13 again. In this way ping-pong effects are avoided or at least reduced.

In summary, the control node 2 may arranged to acquire Wi-Fi compatibility (i.e. standard version) of Wi-Fi APs 13. Since load balance may be supported, the Wi-Fi APs 13 may periodically update their traffic load to the control node 2. When a candidate WD 17 enters the coverage area of the WiFi AP 13 and an offload request is initiated, the control node 2 receives the version of the candidate WD's 17 Wi-Fi module and checks if it matches the AP's version. If the version is matched or the WD's 17 Wi-Fi module's version is equal or even higher than that of the WiFi AP 13, offload may be allowed. Otherwise, the control node 2 needs to make the decision based on performance impact, such as the current traffic load of the impacting WiFi AP 13. If the performance impact on the WiFi AP 13 is equal or higher than a predefined threshold, offload is not allowed. Else if the performance impact on the WiFi AP 13 is lower than the predefined threshold, offload is allowed and the mismatch record may be stored. When more WDs 17 are added to the Wi-Fi network by being associated with the WiFi AP 13 this may result in that the traffic load of the WiFi AP 13 exceeds the threshold. The recorded mismatch WD 17 may then be turned back to the cellular network so that the Greenfield mode of the Wi-Fi network can be supported in order to achieve a high system performance.

Whilst at least some of the disclosed embodiments are based on comparing parameters received from network operation to one or more thresholds, the concepts presented herein may also utilize other performance measures. For example, instead of comparing actual performance impact to a threshold the offloading determination may be based on network simulations.

The present disclosure has mainly been described above with reference to a few embodiments. However, as is readily appreciated by a person skilled in the art, other embodiments than the ones disclosed above are equally possible within the scope of the present disclosure, as defined by the appended patent claims. The present disclosure does not overlap with any Wi-Fi association and/or authentication procedure and could be implemented as complementary to any Wi-Fi offload algorithm such as any Wi-Fi access prioritized methods or load balance methods.

The invention claimed is:

1. A method for indicating network connection, the method being performed in a control node, comprising the steps of:
   receiving an indication pertaining to at least partly transfer a data transmission service of a wireless device from using a first network access method to using a second network access method associated with a network node, wherein the second network access method comprises use of any one of a plurality of different physical layer methods, each identified by a respective one of a plurality of compatibility versions, the network node being associated with one of the compatibility versions and also configured to perform at least one other compatibility version of the physical layer methods of the second network access method, the indication comprising a compatibility version of the wireless device for the second network access method;
   comparing said compatibility version of the wireless device to said associated compatibility version of the network node; and
   determining if there is a version mismatch between said compatibility version of the wireless device and said compatibility version of the network node, and if so:
      determining an expected performance impact on the network node that would be attributable to supporting the wireless device using the compatibility version of the wireless device for the second network access method; and
      indicating, based on the determined performance impact, whether or not the wireless device is allowed to establish a connection to the network node; and
   establishing the connection between the wireless device and the network node, wherein the connection is established when combined load of wireless device and network node is less than saturated load of network node;
   acquiring reports from the network node regarding a current performance using the second network access method;
   determining said current performance to be worse than a predetermined performance threshold;
   identifying at least one wireless device associated with version mismatch between a compatibility version of the at least one wireless device and said compatibility version of the network node: and
   providing an indication that said identified at least one wireless device is to be disconnected from using the second network access method, wherein disconnection is based on module version of wireless device.

2. The method according to claim 1, further comprising: storing registration information of the wireless device relating to compatibility version of the wireless device for the second network access method in conjunction with indicating that the wireless device is allowed to establish a connection to the network node.

3. The method according to claim 1, further comprising: storing the determined expected performance impact in conjunction with indicating that the wireless device is allowed to establish a connection to the network node.

4. The method according to claim 1, wherein the performance impact relates to a reduction of data transfer rate from the network node in a case the wireless device is connected to the network node.

5. The method according to claim 4, further comprising: indicating that the wireless device is allowed to establish the connection to the network node in a case said data transfer rate is reduced less than a predetermined data transfer rate threshold.

6. The method according to claim 5, further comprising: indicating that the wireless device is allowed to establish a connection to the network node in a case said current traffic load is lower than a predetermined traffic load threshold.

7. The method according to claim 1, wherein the performance impact depends on a current traffic load of the network node.

8. The method according to claim 1, further comprising, in a case the wireless device is not allowed to establish the connection to the network node:
   comparing said compatibility version of the wireless device to a compatibility version of another network node; and
   repeating, for the wireless device and the another network node, the steps of determining version mismatch, determining expected performance impact and indicating allowance to establish connection.

9. The method according to claim 1, wherein at least part of the data payload traffic of the data transmission service is transferred to the connection between the wireless device and the network node.

10. The method according to claim 1, wherein at least part of the signaling traffic of the data transmission service keeps using the first network access method.

11. The method according to claim 1, wherein the report is a data traffic report.

12. The method of claim 1, wherein the computer includes a plurality of processing cores.

13. The method according to claim 1, wherein the predetermined performance threshold relates to a current traffic load of the network node.

14. The method according to claim 1 wherein said at least one identified wireless device is further identified based on its current performance impact in the second network.

15. The method according to claim 1, wherein the first network access method utilizes cellular radio communications.

16. The method according to claim 1, wherein the second network access method utilizes WiFi communications.

17. The method according to claim 16, wherein the network node is a WiFi access point.

18. The method according to claim 16, wherein the compatibility version is a WiFi version, and the compatibility version of the network node is a WiFi version.

19. The method according to claim 1, wherein the indication is received from the network node.

20. The method according to claim 1, wherein the indication is received from a network node of the first network access method.

21. The method according to claim 1, wherein the indication is received from the wireless device.

22. A control node for determining network connection, the control unit comprising:
 a receiver arranged to receive an indication pertaining to at least partly transfer a data transmission service of a wireless device from using a first network access method to using a second network access method associated with a network node, wherein the second network access method comprises use of any one of a plurality of different physical layer methods, each identified by a respective one of a plurality of compatibility versions, the network node being associated with one of the compatibility versions and also configured to perform at least one other compatibility version of the physical layer methods of the second network access method, the indication comprising a compatibility version of the wireless device for the second network access method;
 a processing unit arranged to compare said compatibility version of the wireless device to said associated compatibility version of the network node; and to determine if there is a version mismatch between said compatibility version of the wireless device and said compatibility version of the network node, and if so:
  to determine an expected performance impact on the network node that would be attributable to supporting the wireless device using the compatibility version of the wireless device for the second network access method; and
  to indicate, based on the determined performance impact, whether or not the wireless device is allowed to establish a connection to the network node; and
 a transmitter arranged to establish the connection between the wireless device and the network node; wherein the connection is established when combined load of wireless device and network node is less than saturated load of network node;
 acquiring reports from the network node regarding a current performance using the second network access method;
 determining said current performance to be worse than a predetermined performance threshold;
 identifying at least one wireless device associated with version mismatch between a compatibility version of the at least one wireless device and said compatibility version of the network node; and
 providing an indication that said identified at least one wireless device is to be disconnected from using the second network access method, wherein disconnection is based on module version of wireless device.

23. The control node according to claim 22, wherein the processing unit is further arranged to: store registration information of the wireless device relating to compatibility version of the wireless device for the second network access method in conjunction with indicating that the wireless device is allowed to establish a connection to the network node.

24. The control node according to claim 22, wherein the processing unit is further arranged to: store the determined expected performance impact in conjunction with indicating that the wireless device is allowed to establish a connection to the network node.

25. The control node according to claim 24, wherein the processing unit is further arranged to: indicate that the wireless device is allowed to establish the connection to the network node in a case said data transfer rate is reduced less than a predetermined data transfer rate threshold.

26. The control node according to claim 25, wherein the processing unit is further arranged to: indicate that the wireless device is allowed to establish a connection to the network node in a case said current traffic load is lower than a predetermined traffic load threshold.

27. The control node according to claim 22, wherein the processing unit is further arranged to, in a case the wireless device is not allowed to establish the connection to the network node: compare said compatibility version of the wireless device to a compatibility version of another network node; and to repeat, for the wireless device and the another network node, the steps of determining version mismatch, determining expected performance impact and indicating allowance to establish connection.

28. The control node according to claim 22, further comprising: a transmitter arranged to establish the connection between the wireless device and the network node.

29. The control node according to claim 28, wherein the processing unit is further arranged to: acquire reports from the network node regarding a current performance using the second network access method.

30. The control node according to claim 29, wherein the processing unit is further arranged to: determine said current performance to be worse than a predetermined performance threshold.

31. The control node according to claim 30, wherein the processing unit is further arranged to: identify at least one wireless device associated with version mismatch between a compatibility version of the at least one wireless device and said compatibility version of the network node.

32. The control node according to claim 31, wherein the processing unit is further arranged to: provide an indication that said identified at least one wireless device is to be disconnected from using the second network access method.

33. A Non-transitory computer-readable storage medium comprising a computer program for determining network connection, the computer program comprising computer program code which, when run on a control node, causes the control node to:
 receive an indication pertaining to at least partly transfer a data transmission service of a wireless device from using a first network access method to using a second network access method associated with a network node, wherein the second network access method comprises use of any one of a plurality of different physical layer methods, each identified by a respective one of a plurality of compatibility versions, the network node being associated with one of the compatibility versions and also configured to perform at least one other compatibility version of the physical layer methods of the second network access method, the indication comprising a compatibility version of the wireless device for the second network access method;
 compare said compatibility version of the wireless device to said associated compatibility version of the network node; and
 determine if there is a version mismatch between said compatibility version of the wireless device and said compatibility version of the network node, and if so:
  determine an expected performance impact on the network node that would be attributable to supporting the wireless device using the compatibility version of the wireless device for the second network access method;
indicate, based on the determined performance impact, whether or not the wireless device is allowed to establish a connection to the network node; and
establish a connection with the wireless device, wherein the connection is established when combined load of wireless device and network node is less than saturated load of network node;
acquire reports from the network node regarding a current performance using the second network access method;
determine said current performance to be worse than a predetermined performance threshold;
identify at least one wireless device associated with version mismatch between a compatibility version of the at least one wireless device and said compatibility version of the network node; and
provide an indication that said identified at least one wireless device is to be disconnected from using the second network access method, wherein disconnection is based on module version of wireless device.

* * * * *